United States Patent [19]

Schäty

[11] Patent Number: 4,550,891
[45] Date of Patent: Nov. 5, 1985

[54] PLASTIC PIPE CLIP

[75] Inventor: Harald Schäty, Wetzlar, Fed. Rep. of Germany

[73] Assignee: USM Corporation, Farmington, Conn.

[21] Appl. No.: 539,645

[22] Filed: Oct. 6, 1983

[30] Foreign Application Priority Data

Oct. 15, 1982 [DE] Fed. Rep. of Germany ....... 3238345
Oct. 15, 1982 [DE] Fed. Rep. of Germany ... 8229029[U]

[51] Int. Cl.[4] ............................................. F16L 3/22
[52] U.S. Cl. ................................. 248/68.1; 248/74.2;
24/339; 174/166 R
[58] Field of Search ......... 248/62, 65, 68.1, 74.1–74.3,
248/316.1, 316.2, 316.3, 316.5, 316.7; 24/339,
336, 335, 337, 457, 535–536; 174/166 R

[56] References Cited

U.S. PATENT DOCUMENTS 3,080,140  3/1963  Gohs ................................. 248/74.1
3,584,348  6/1971  Soltysik .
4,358,080  11/1982  Wolker .
4,450,605  5/1984  Schaty ................................ 24/457

FOREIGN PATENT DOCUMENTS 716272    6/1967   Belgium .
679575    8/1939   Fed. Rep. of Germany .
1139706   11/1962  Fed. Rep. of Germany .
7916813   6/1979   Fed. Rep. of Germany .
2908120   9/1980   Fed. Rep. of Germany ..... 248/68.1
3029975   3/1982   Fed. Rep. of Germany ..... 248/68.1
3048382   7/1982   Fed. Rep. of Germany .
450517    4/1968   Switzerland .
1123232   8/1968   United Kingdom .
1209494   10/1972  United Kingdom ............... 174/164
1297663   11/1972  United Kingdom .
1338325   11/1973  United Kingdom ............... 248/68.1
2064232   6/1981   United Kingdom .
2090320   7/1982   United Kingdom ............... 248/74.1

Primary Examiner—J. Franklin Foss
Assistant Examiner—Robert A. Olson
Attorney, Agent, or Firm—Aubrey C. Brine

[57] ABSTRACT

A one-piece plastic pipe clip has one or more pipe-receiving portions, one wall of which is provided by a rockable element which overlies a stud-receiving hole in the clip body so that the element will close over a pipe and secure it when the clip is assembled on a projecting stud. The elements may have staggered teeth to engage a screw thread on the stud and resilient feet to engage the surface from which the stud projects.

4 Claims, 4 Drawing Figures

PLASTIC PIPE CLIP

BACKGROUND OF THE INVENTION

This invention is concerned with plastic pipe clips, and more particularly with plastic pipe clips of a kind for securing one or more pipes to a stud projecting from a surface, comprising a pipe-receiving portion for a pipe and a stud-receiving hole through a body portion of the clip, the axis of the hole lying in a direction transverse to that of a pipe in the pipe-receiving portion, the pipe-receiving portion providing an arcuate wall to embrace a pipe, part of which wall is movable between an open position to admit a pipe and a closed position to retain it.

It is desirable that pipe clips for attaching pipes to the bodies of motor vehicles be generally easy to assemble, especially where they occur in positions which are difficult of access, and difficult to disassemble so that the pipes are retained securely and will not work loose under conditions of vibration experienced in running the vehicles. An example of a clip of the kind referred to is described in U.K. Patent Specification No. 1297663, but while the clip there-described secures the pipe against inadvertent release for so long as the pipe clip remains installed on the car body, the clip does not readily lend itself to use on those production lines where pipes are assembled at least partly automatically, for example by assembling pipe lengths with the clips on a jig adjacent the line, and transferring the resulting assemblage bodily to the car body. Nor does the clip there-described enable a procedure to be readily followed where the clip can be assembled on the stud in a partially installed condition ready to receive a pipe and then finally pushed or otherwise moved into a fully securing condition.

It is therefore an object of the invention to provide an improved pipe clip which facilitates the assembly of a pipe in secure relationship to a stud, for example in the manufacture of a motor vehicle.

SUMMARY OF THE INVENTION

The foregoing object is achieved in accordance with the invention in that a clip of the type referred to above is characterized by the movable part of the wall of the pipe-receiving portion being constituted by an element integral with and rockable relative to the body portion of the clip, a rear side of said element opposite to said wall overlapping the stud-receiving hole, so that a stud projecting through said hole behind said element holds it in its closed position.

Preferably, in a clip according to the invention, the rockable element at the side overlapping said hole has teeth for engagement with a toothed configuration of the stud. In order to accommodate the pitch of the stud thread and enable said element to engage the flanks of the thread, the body portion may have resilient feet to engage the surface from which the stud projects. Furthermore, the clip may have two pipe-receiving portions lying parallel to one another at either side of said hole and the teeth on the rear sides of said element may be staggered so as to register with the thread of a screw-threaded stud.

The material of a clip in accordance with the invention may, where said element joins the body portion, be thin and provide a hinge about which said element can rock. Another face of said element remote from said hinge may be flat and so disposed as to be at right angles to the axis of the stud-receiving hole when the element is in its closed position, thereby to facilitate automatic assembly of the clip on a stud.

Preferably, the pipe-receiving portion of a clip in accordance with the invention has a stiff outer arm which, with the rockable element, encircles sufficient of a pipe in said portion to ensure its retention even before the clip is assembled on a stud, and the stud-receiving hole in the body portion may have a diameter such that the body portion can initially be held on the tip of the stud, thus enabling an assemblage of pipes and clips to be disposed on a plurality of studs before being pushed into firmly secured positions in which the rockable elements clamp and lock the pipe, or pipes, in position.

BRIEF DESCRIPTION OF THE DRAWINGS

There now follows a description to be read with reference to the accompanying drawing of a pipe clip embodying the invention and illustrative thereof, wherein.

DESCRIPTION OF THE PREFERRED EMBODIMENT

Figure 4:
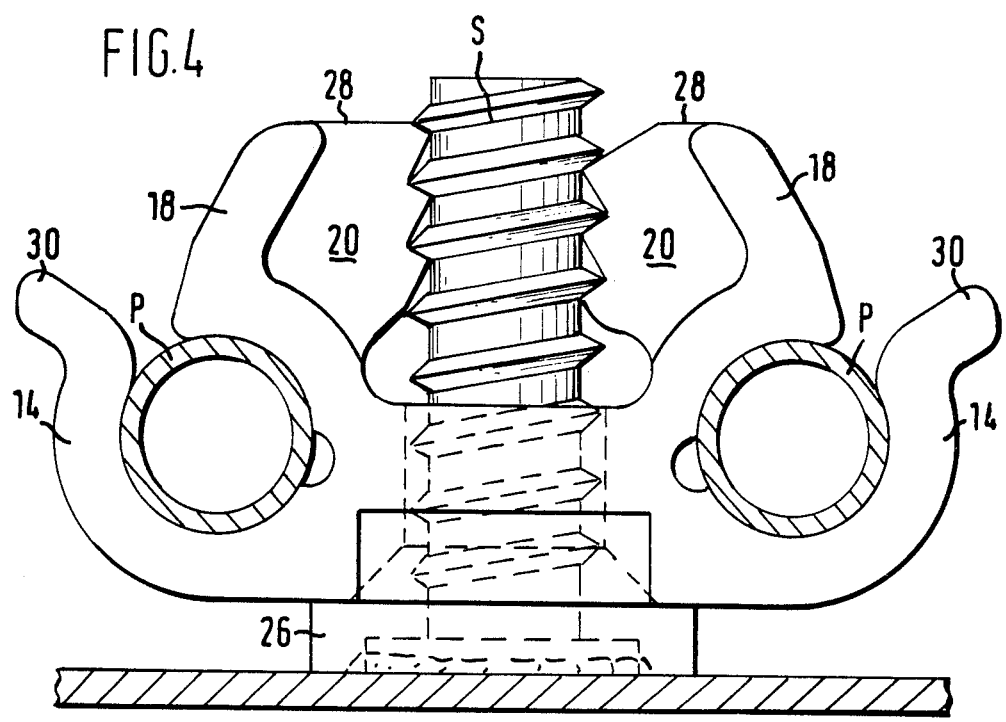
FIG. 4 is a view similar to FIG. 1 of the illustrative clip but showing two pipes retained by the clip and secured to a screw-threaded stud.

The illustrative clip, which is designed to hold two pipes, comprises a body portion 10 through which extends a vertical hole 12 for the reception of a screw-threaded stud S (FIG. 4). The diameter of the hole 12 at least at its lower end affords a light attachment to the stud so that the clip will be retained temporarily on the top of the stud before it is driven fully onto it.

Two stiff arcuate arms 14 extend outwardly in opposite directions from the body portion and upwardly at each side of the hole 12 and define in part the walls of two pipe-receiving portions 16 whose parallel axes lie in a direction at right angles to that of the hole 12. The wall of each portion 16 is also in part provided by a front side of a rockable element 18 at a rear side of which, on a vertical rib 20, there are provided teeth 22 overlapping the hole 12. Each element is joined to the body portion 10 by relatively thin material, which constitutes a hinge 24 about which the element can rock. Each element 18 is thus movable between an open position (in which it is molded, see FIG. 1) and a closed, or clamping, position (FIG. 4) in which with outer arm 14 it will grip a pipe P. It moves from the one position to the other when the clip is pushed fully onto the stud S so that the stud comes between the elements 18. The teeth 22 engage the flanks of the thread on the stud S, and when, as shown in the drawing, the stud has a screw thread, the teeth are preferably staggered on the two elements so that they register with the thread at both sides of the stud. The teeth of the elements are of the same pitch as the thread of the stud, registration being ensured by resilient feet 26 on the body portion 10 which engage the surface from which the stud projects. The stud may, for example, be welded to this surface.

Figure 1:
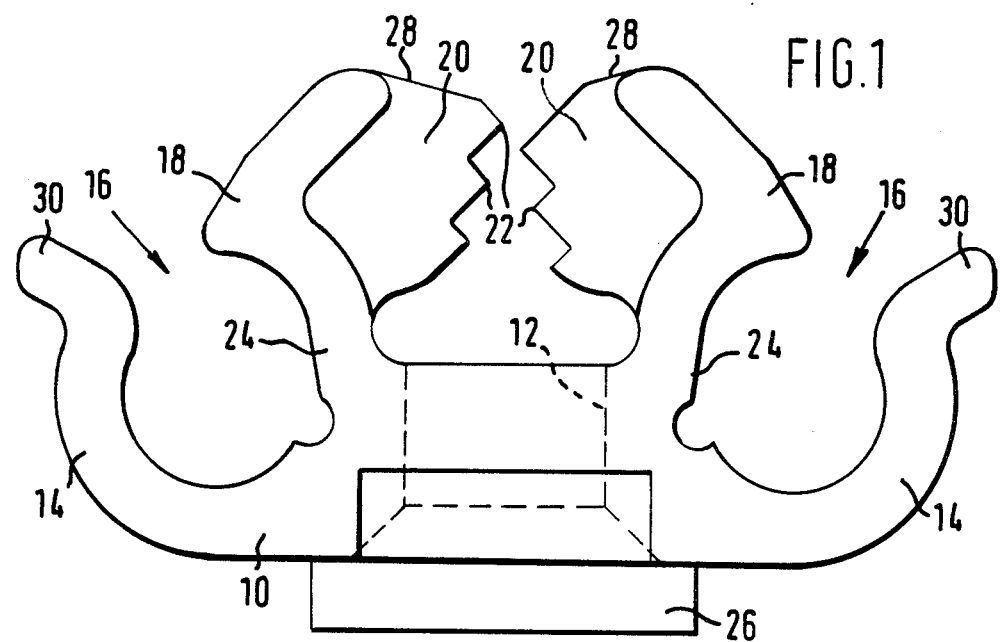
FIG. 1 is a view in side elevation of the illustrative clip before assembly therein of a pipe.
Figure 2:
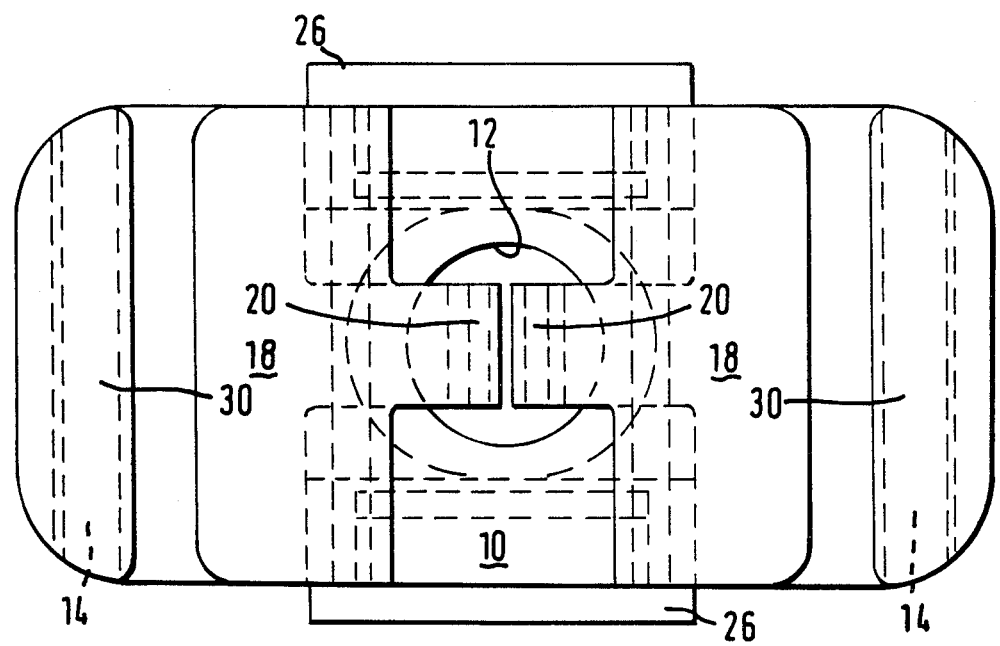
FIG. 2 is a top plan view of the illustrative clip as shown in FIG. 1.
Figure 3:
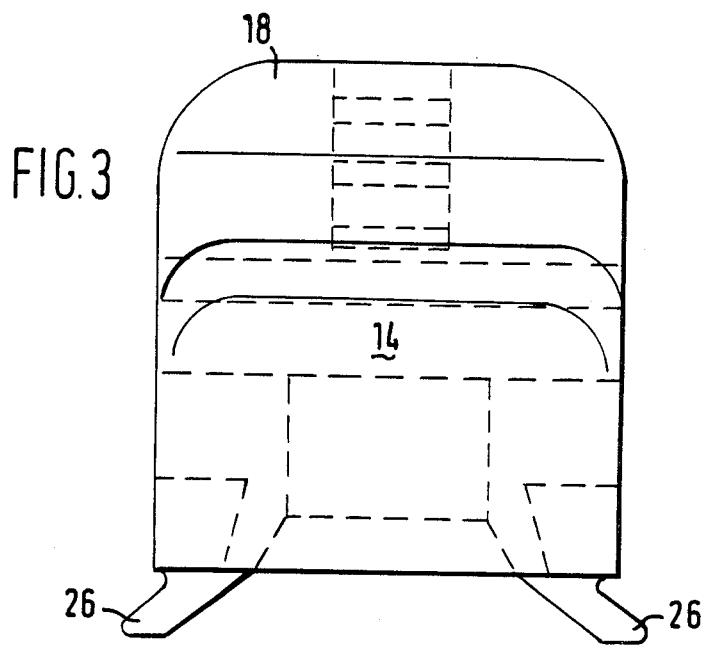
FIG. 3 is an end view of the illustrative clip as shown in FIG. 1.

In the molded condition of the illustrative clip, as shown in FIG. 1, the ribs 20, which are formed with the teeth 22 and are at the rear sides of the elements 18, project close to the axis of the hole 12 so as to overlap it and ensure adequate rocking of the elements about the hinges 24 when the clip is pushed fully onto the stud. Front faces of the elements extend at their free ends close enough to the free ends of the arms 14 to ensure loose retention of a pipe in the pipe-receiving portion 16 before the clip is assembled on a stud. Thus an assemblage of pipes and clips for the underside of a car, for example, can be prepared in a jig, off the car assembly line, and transferred as a whole for automatic attachment to the studs on the car body. To facilitate such automatic assembly, upper faces 28 of the elements 18 are preferably flat to provide a common reference surface (as shown in the drawing) and so disposed that they become horizontal when the clip is pushed fully onto a vertical stud.

Alternatively, the clips can be partially pushed onto the studs so that the studs extend into, but not beyond, the holes 12, and the pipes then assembled on the clips, before finally pushing the clips fully on the studs to lock the elements into their clamping, or locking, positions.

While the outer arms 14 are stiff, and normally remain rigid in application of the pipes, they are provided with extended lips 30 by which, with the aid of a screwdriver or other convenient tool, they can be deflected sufficiently to release the pipes, should it ever become necessary.

I claim:

1. A plastic clip for securing one or more pipes to a threaded stud projecting from a surface, comprising, a body portion having a pair of pipe receiving portions extending upwardly therefrom each adapted for receiving a pipe and lying parallel to one another at either side of a stud receiving hole formed through a body portion of said clip, the axis of said hole lying in a direction transverse to that of a pipe when received in said pipe-receiving portion, said pipe receiving portions each providing an arcuate wall positioned to embrace a pipe when received in said pipe-receiving portion, part of said wall being movable between an open position to admit a pipe and a closed position to retain a pipe, said movable part of said wall of each pipe-receiving portion being comprised of an element integral with and rockable relative to said body portion of said clip, a rear side of each said element opposite to said wall overlapping said stud receiving hole and having teeth provided thereon for engagement with a thread configuration on the stud, and said body portion further having resilient feet extending downwardly therefrom to engage the surface from which the stud extends to accommodate registration of said teeth with a flank portion of said stud thread whereby a threaded stud when projecting through said hole behind said element holds said arcuate wall in its closed position with said teeth in engagement with the stud thread.

2. A clip according to claim 1 wherein teeth on the rear side of one of said elements is staggered relative to said teeth on the rear side of the other of said elements so as to register with a stud having a screw thread configuration formed thereon.

3. A clip according to claim 1 wherein, the material of the clip where said element joins said body portion is thin and provides a hinge about which said element can rock.

4. A clip according to claim 1 in which said pipe-receiving portion has a stiff outer arm which, with said rockable element, retains a pipe in said position before the clip is assembled on a stud.

* * * * *